United States Patent
Karaoguz et al.

(10) Patent No.: US 7,312,700 B2
(45) Date of Patent: Dec. 25, 2007

(54) GPS ENABLED CELL PHONE WITH COMMON INTEREST ALERTS

(75) Inventors: Jeyhan Karaoguz, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 223 days.

(21) Appl. No.: 11/069,536

(22) Filed: Mar. 1, 2005

(65) Prior Publication Data
US 2006/0164238 A1    Jul. 27, 2006

Related U.S. Application Data

(60) Provisional application No. 60/647,208, filed on Jan. 26, 2005.

(51) Int. Cl.
*H04Q 7/00* (2006.01)
*H04Q 7/20* (2006.01)

(52) U.S. Cl. .............. 340/539.1; 340/539.11; 340/539.13; 340/539.2; 340/539.23; 455/456.1; 455/456.2; 455/456.3; 455/457

(58) Field of Classification Search .......... None
See application file for complete search history.

(56) References Cited

U.S. PATENT DOCUMENTS

| | | | | |
|---|---|---|---|---|
| 6,618,593 | B1 * | 9/2003 | Drutman et al. | 455/456.3 |
| 2005/0038876 | A1 * | 2/2005 | Chaudhuri | 709/219 |
| 2005/0181803 | A1 * | 8/2005 | Weaver et al. | 455/456.1 |

* cited by examiner

*Primary Examiner*—Julie Bichngoc Lieu
(74) *Attorney, Agent, or Firm*—Garlick Harrison & Markison; Bruce E. Garlick

(57) ABSTRACT

A "seeking" wireless terminal determines its location coordinates via access of its GPS receiver. The seeking wireless terminal then sends a seeking request via a supporting wireless network infrastructure. The seeking request includes at least one interest item entered by a user of the seeking wireless terminal and also the location coordinates of the seeking wireless terminal. The location coordinates may include an elevation of the wireless terminal. The seeking wireless terminal receives a seeking response via the supporting wireless network infrastructure that includes location coordinates of a "sought" wireless terminal. The seeking wireless terminal accesses a map segment corresponding to the location coordinates of the seeking wireless terminal and to the location coordinates of the sought wireless terminal. Then, the seeking wireless terminal displays the map segment, an icon that represents the seeking wireless terminal, and an icon that represents the sought wireless terminal.

20 Claims, 11 Drawing Sheets

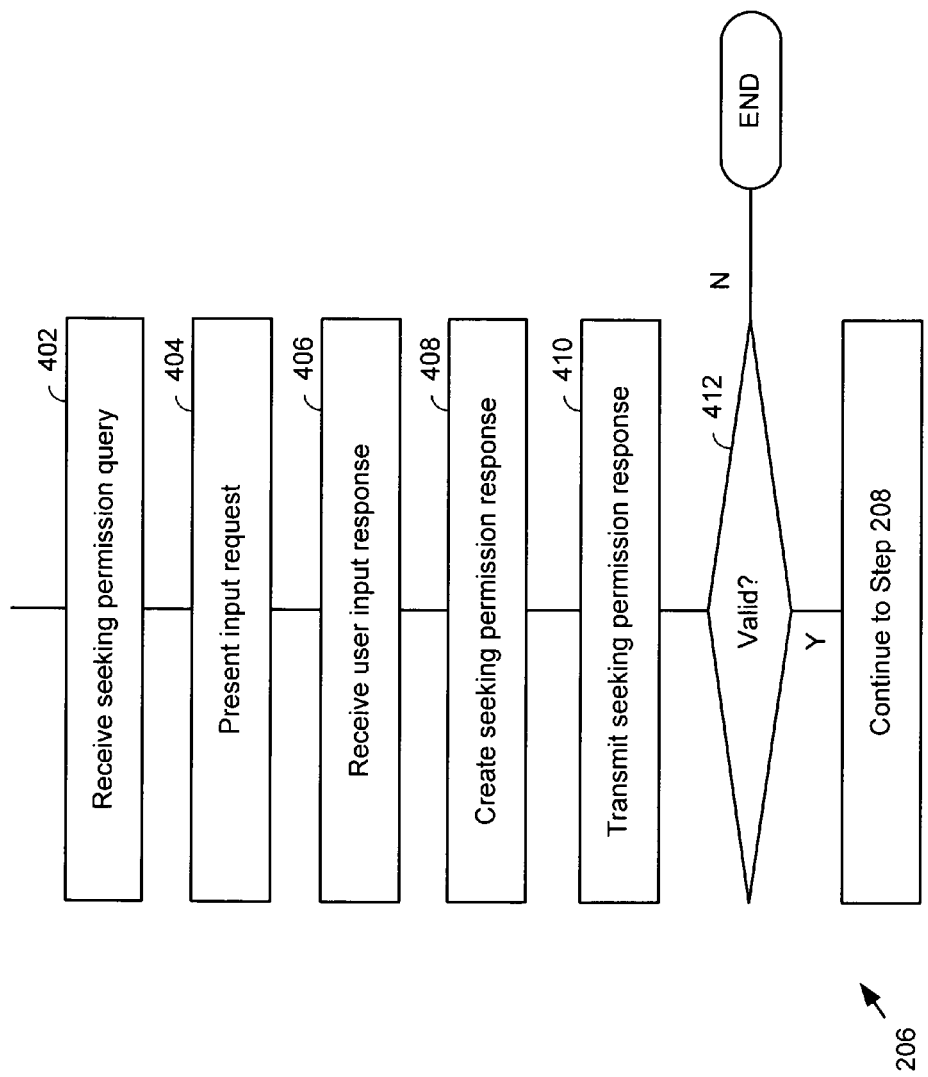

GPS ENABLED CELL PHONE WITH COMMON INTEREST ALERTS

CROSS REFERENCE TO RELATED APPLICATION

This application claims priority to U.S. Provisional Patent Application Ser. No. 60/647,208, filed Jan. 26, 2005, which is incorporated herein by reference for all purposes.

BACKGROUND

1. Field of the Invention

The present invention relates generally to wireless communications; and more particularly to operations supported by a wireless terminal.

2. Background of the Invention

Communication systems are well known. Communication systems include both wired communication systems and wireless communication systems. Wired communication systems include the Public Switched Telephone Network (PSTN), Wide Area Networks (WANs), Local Area Networks (LANs), and other networks that use wired or optical media for the transmission of data. Wireless communication systems include cellular telephone systems, satellite communication systems, Wireless Wide Area Networks (WWANs), Wireless Local Area Networks (WLANs), Wireless Personal Area Networks (WPANs), and other networks that employ a wireless link between a serviced terminal and a network infrastructure. Of course, many communications are serviced using a combination of wireless communication systems and wired communication systems.

Wireless terminals were originally used to service only voice communications. However, wireless terminals now service data communications as well. It is now common to use wireless terminals to send and receive email, send and receive short messages, and to access the Internet. Due to their compactness and agility, wireless terminals should serve additional purposes as well. Such additional purposes would extend the communicative abilities of the user to interact with other users of wireless terminals. For example, wireless terminals do not currently facilitate commerce amongst the users of the wireless terminals as they could. Further, wireless terminals do not currently facilitate personal interaction such as group joining, courting, and other personal interactive activities. Thus, there is a need in the art for a wireless terminal that services these types of operations as well.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 4 is a partial flow diagram illustrating a third optional aspect of the present invention;

DETAILED DESCRIPTION OF THE INVENTION

Figure 1:
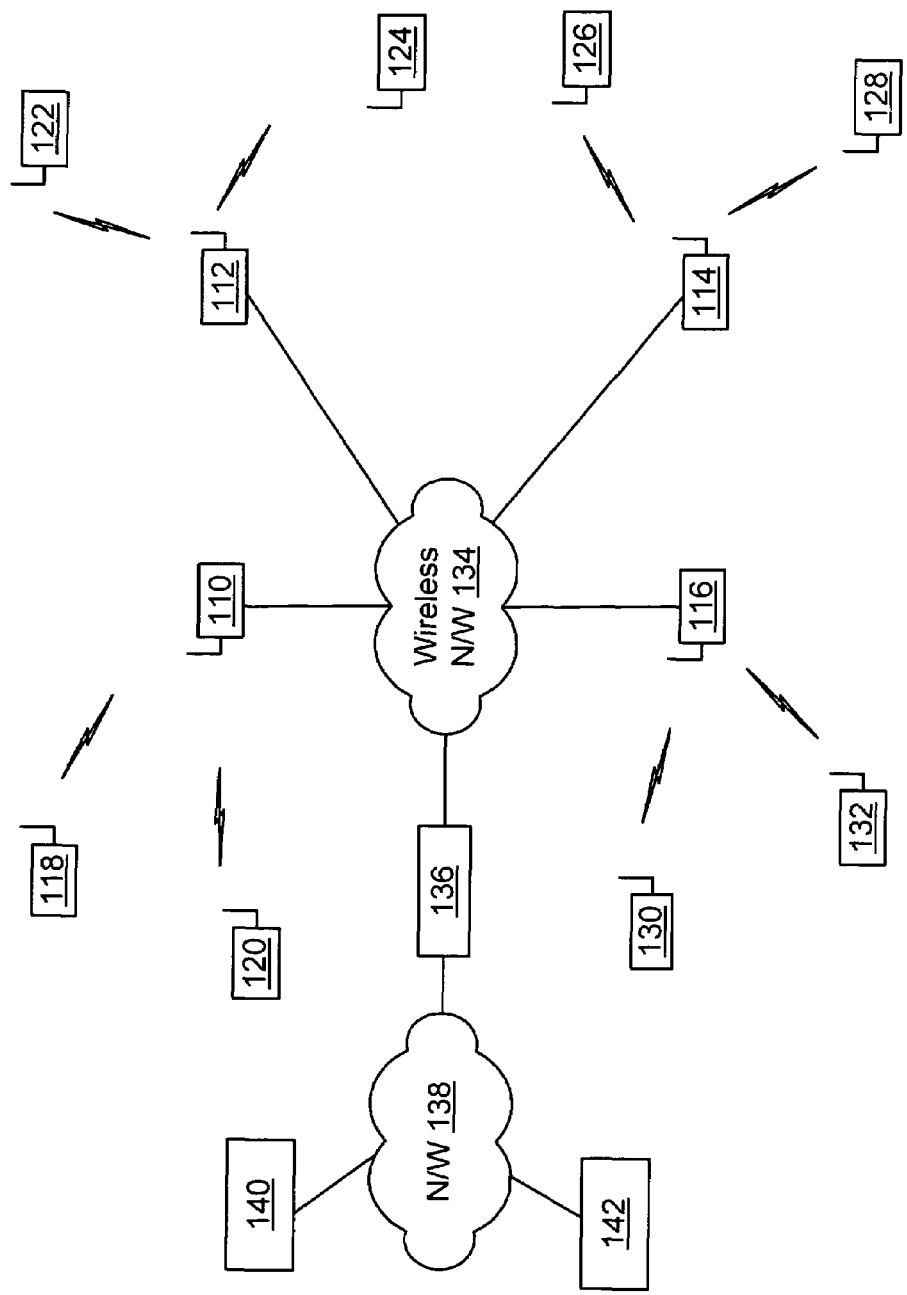
FIG. 1 is a system diagram illustrating a wireless communication system that operates according to the present invention.

FIG. 1 is a system diagram illustrating a wireless communication system that operates according to the present invention. The wireless communication system 100 of FIG. 1 includes one or more servicing base stations and/or wireless access points (WAPs) 110, 112, 114, and 116. The reader should understand that the structure of FIG. 1 is used only to convey the principles of the present invention and is not intended to be a detailed description of a cellular wireless communication system, a Wireless Local Area Network (WLAN), a Wireless Wide Area Network (WWAN), or a Wireless Personal Area Network (WPAN).

As is shown, base station/WAP 110 supports wireless terminals 118 and 120 within a respective serving area, e.g., cell, sector, premises, area, etc. Likewise, base station/WAP 112 supports wireless terminals 122 and 124, base station/WAP 114 supports wireless terminals 126 and 128, and base station/WAP 116 supports wireless terminal 130 and 132. The base stations/WAPs 110, 112, 114, and 116 are serviced via network backbone 134 and interface device 136. The interface device 136 couples the backbone network 134 to another network 138. The another network 138 may include a Local Area Network (LAN), a Wide Area Network (WAN), the Internet, or any other type of network that couples the network backbone 134 via the network interface 136 to computers or terminals 140 and 142. The operation of the wireless communication system 100 and of the wireless terminals 118-132 supported thereby will be described further with reference to FIGS. 2-9 and 10. The structure of the wireless terminals 118-132 will be described further with reference to FIG. 9.

Generally, a method for operating the wireless terminal according to the present invention allows a "seeking" wireless terminal, e.g., 122, to identify and locate a proximately located "sought" wireless terminal, e.g., 124. While the seeking wireless terminal 122 and the sought wireless terminal 124 are named to distinguish their relative functions, any wireless terminal operating according to the present invention could be a seeking wireless terminal and any wireless terminal operating according to the present invention could be a sought wireless terminal. Operation commences with the seeking wireless terminal 122 determining its location coordinates via access of its GPS receiver. The seeking wireless terminal 122 then sends a seeking request via a supporting wireless network infrastructure 134. The seeking request includes at least one interest item entered by a user of the seeking wireless terminal 122 and also the location coordinates of the seeking wireless terminal 122. The location coordinates may include an elevation of the wireless terminal 122. Examples of interest items include information regarding the companionship goals of the user of the seeking wireless terminal 122, information regarding team building goals of the user of the seeking wireless terminal 122, or information regarding the business transaction goals of the user of the seeking wireless terminal 122, for example.

The seeking wireless terminal 122 receives a seeking response via the supporting wireless network infrastructure. The seeking response includes location coordinates of a sought wireless terminal 124. The sought wireless terminal 124 is selected by a device, e.g., 140, coupled to the seeking wireless terminal 122 via the supporting wireless network infrastructure 134. This device 140 identifies and selects the sought wireless terminal 124 based upon the interest item(s) entered by the user of the seeking wireless terminal 122 and included in the seeking request and also interest items that are entered by the user of the sought wireless terminal 124. In such case, the user of the seeking wireless terminal 122 and the user of the sought wireless terminal 124 would have one or more common interests. Operation concludes with the seeking wireless terminal 122 displaying an indication on its display of the relative position of the sought wireless terminal. With this information displayed, the user of the seeking wireless terminal 122 may navigate to the sought wireless terminal 124.

Optionally, the seeking wireless terminal 122 may access a map segment corresponding to the location coordinates of the seeking wireless terminal 122 and to the location coordinates of the sought wireless terminal 124. Then the seeking wireless terminal 122 optionally displays the map segment, an icon that represents the seeking wireless terminal 122, and an icon that represents the sought wireless terminal 124. The icon that represents the seeking wireless terminal 122 is displayed on the map segment at a relative position corresponding to the location coordinates of the seeking wireless terminal 122. Likewise, the icon that represents the sought wireless terminal 124 is displayed on the map segment at a relative position corresponding to the location coordinates of the sought wireless terminal 124.

Figure 2:
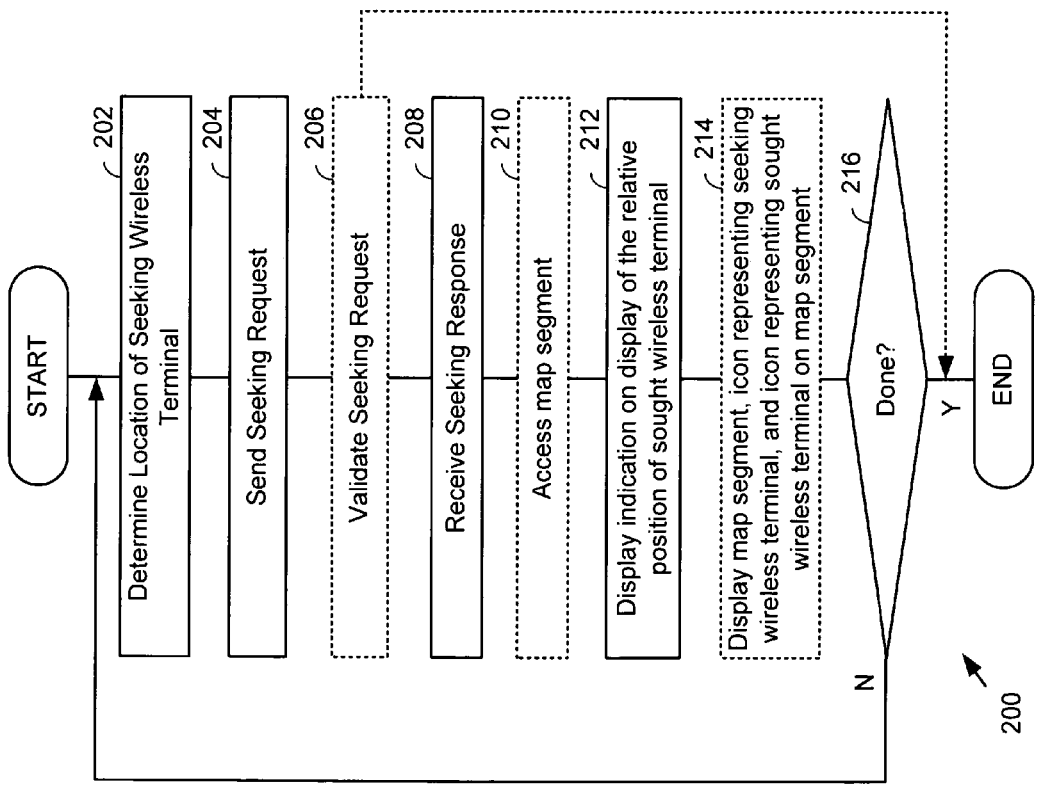
FIG. 2 is a flow chart illustrating a first embodiment of operation according to the present invention.

FIG. 2 is a flow chart illustrating a first embodiment of operation according to the present invention. Operation 200 commences with the seeking wireless terminal determining its location coordinates via access of its GPS receiver (Step 202). Then, the seeking wireless terminal sends a seeking request via a supporting wireless network infrastructure (Step 204). The seeking request includes at least one interest item entered by the user of the seeking wireless terminal and the location coordinates of the seeking wireless terminal. Examples of interest items may include information regarding the companionship goals of the user of the seeking wireless terminal, information regarding team building goals of the user of the seeking wireless terminal, or information regarding the business transaction goals of the user of the seeking wireless terminal, for example.

The seeking request may include additional information entered by the user. Examples of such additional information include the identity of the user of the seeking wireless terminal, information regarding a physical appearance of the user of the seeking wireless terminal, a picture of the user of the seeking wireless terminal, and personal information regarding the user of the seeking wireless terminal. The additional information could also be a user statement intended for a user of the sought wireless terminal, information regarding an age of the user of the seeking wireless terminal, information regarding societal demographics of the user of the seeking wireless terminal, or information regarding available meeting times of the user of the seeking wireless terminal, for example.

Then, optional validation operations are performed to determine whether the seeking request is valid (Step 206). The operations of Step 206 will be described further with reference to FIG. 4. If the seeking request is not valid, operation ends. However, if the seeking request is valid, the seeking wireless terminal receives a seeking response via the supporting wireless network infrastructure (Step 208). The seeking response includes the location coordinates of a sought wireless terminal. The seeking response may also include additional information such as an identity of the user of the sought wireless terminal, information regarding the physical appearance of the user of the sought wireless terminal, a picture of the user of the sought wireless terminal, or personal information regarding the user of the sought wireless terminal. Further, such additional information may include a user statement intended for the user of the seeking wireless terminal, a user query intended for the user of the seeking wireless terminal, information regarding an age of the user of the seeking wireless terminal, information regarding societal demographics of the user of the seeking wireless terminal, or information regarding available meeting times of the user of the seeking wireless terminal, for example.

Then, the seeking wireless terminal optionally accesses a map segment corresponding to the location coordinates of the seeking wireless terminal and to the location coordinates of the sought wireless terminal (Step 210). In optionally accessing the map segment, the seeking wireless terminal may access internal storage to obtain the map segment. Alternatively, the seeking wireless terminal may send a map segment download request via the supporting wireless network infrastructure to a serving map server. In such case, the seeking wireless terminal will then download the map segment from the serving map server via the supporting wireless network infrastructure.

The seeking wireless terminal then displays an indication on its display of the relative position of the sought wireless terminal with respect to itself (Step 212). Optionally, when the seeking wireless terminal has downloaded the map segment, the seeking wireless terminal displays the map segment, an icon that represents the seeking wireless terminal, and an icon that represents the sought wireless terminal on a display of the seeking wireless terminal (Step 214). The icon that represents the seeking wireless terminal is displayed on the display at a relative position of the location coordinates of the seeking wireless terminal on the map segment. Likewise, the icon that represents the sought wireless terminals display on the map segment on the display at a relative position of the location coordinates of the sought wireless terminal. When operation is completed (as determined at Step 216) operation ends. If not, operation returns to Step 202 from Step 216.

Figure 3B:
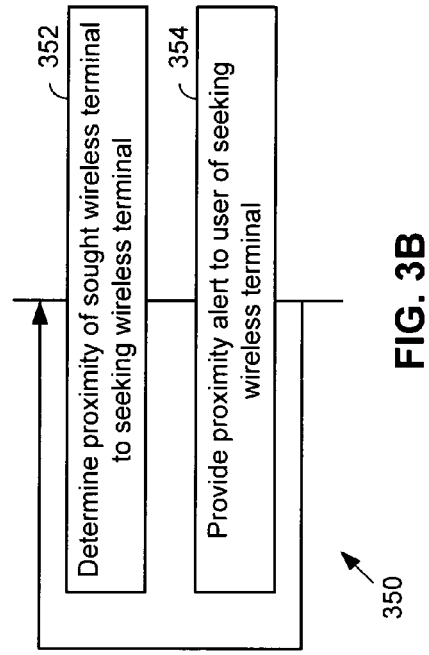
FIG. 3B is a partial flow chart illustrating a second optional aspect of the present invention.
Figure 3A:
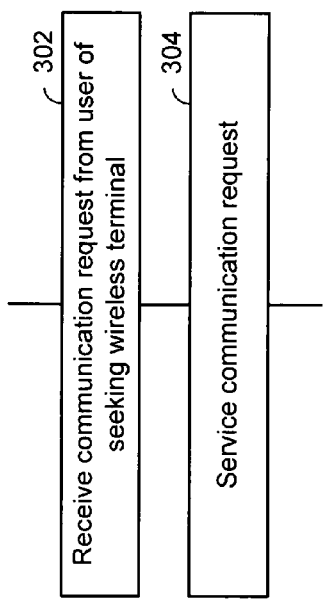
FIG. 3A is a partial flow chart illustrating a first optional aspect of the present invention.

FIG. 3A is a partial flow chart illustrating a first optional aspect of the present invention. The operation 300 commences with the wireless terminal receiving a communication request from the user of the seeking wireless terminal (Step 302). Operation continues with servicing the communication request by servicing the communication to the sought wireless terminal (Step 304). The operation 300 may be performed in conjunction with the operation of Step 212 of FIG. 2. In servicing the communication, the seeking wireless terminal may send an email message to the sought wireless terminal, send a short message to the sought wireless terminal, or establish a voice communication with the sought wireless terminal, for example.

FIG. 3B is a partial flow chart illustrating a second optional aspect of the present invention. The operations 350 of FIG. 3B may be performing in conjunction with Step 212 of FIG. 2. According to this optional aspect, the seeking wireless terminal determines proximity of the sought wireless terminal to the seeking wireless terminal (Step 352). The seeking wireless terminal then, based upon the proximity, provides a proximity alert to the user of the seeking wireless terminal. The proximity alert may be a flashing light having a flashing pattern corresponding to the proximity, an audible alarm having an audible pattern corresponding to the proximity, a visual meter reading having an indicated magnitude corresponding to the proximity, or a visual vector reading having an indicated magnitude and direction corresponding to the proximity. The meter reading and vector reading may be displayed on the display of the seeking wireless terminal. Such proximity alert may be updated via re-execution of steps 352 and 354. In updating the proximity, the seeking wireless terminal may re-determine its location coordinates (at Step 202 of FIG. 2) and re-receive the location coordinates of the sought wireless terminal.

FIG. 4 is a partial flow diagram illustrating a third optional aspect of the present invention. FIG. 4 illustrates in more detail the operations of Step 206 of FIG. 2. Operation commences with the seeking wireless terminal receiving a seeking permission query from a requesting device via the supporting wireless network infrastructure (Step 402). The requesting device may be the sought wireless terminal. Alternatively, the requesting device may be a monitoring location terminal that serves as a gate keeper for seeking operations, for example. The seeking wireless terminal then presents an input request via a user interface to a user in response to the seeking permission query (Step 404). The seeking wireless terminal then receives a user input response via the user interface (Step 406) and creates a seeking permission response based upon the user input response (Step 408). The seeking wireless terminal then transmits the seeking permission response via the supporting wireless network infrastructure to the requesting device (Step 410). When the seeking permission response is not valid (as determined at Step 412) operation ends. Such ending of operation directly relates to the end of operation shown in FIG. 2. However, when the seeking permission response is valid, operation from Step 412 continues to Step 208 of FIG. 2.

Figure 5:
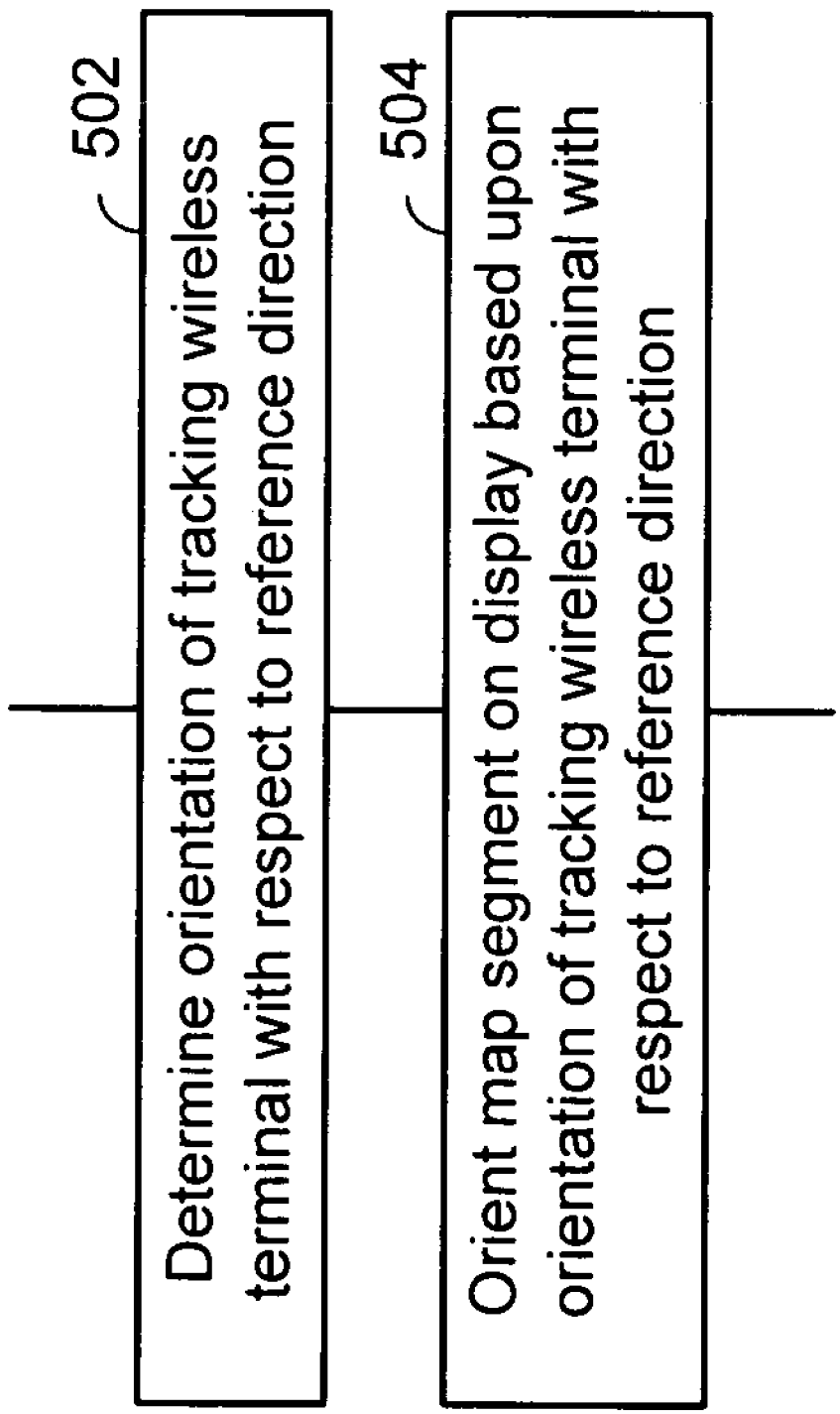
FIG. 5 is a partial flow diagram illustrating "compass mode" operation according to the present invention.
Figure 6A:
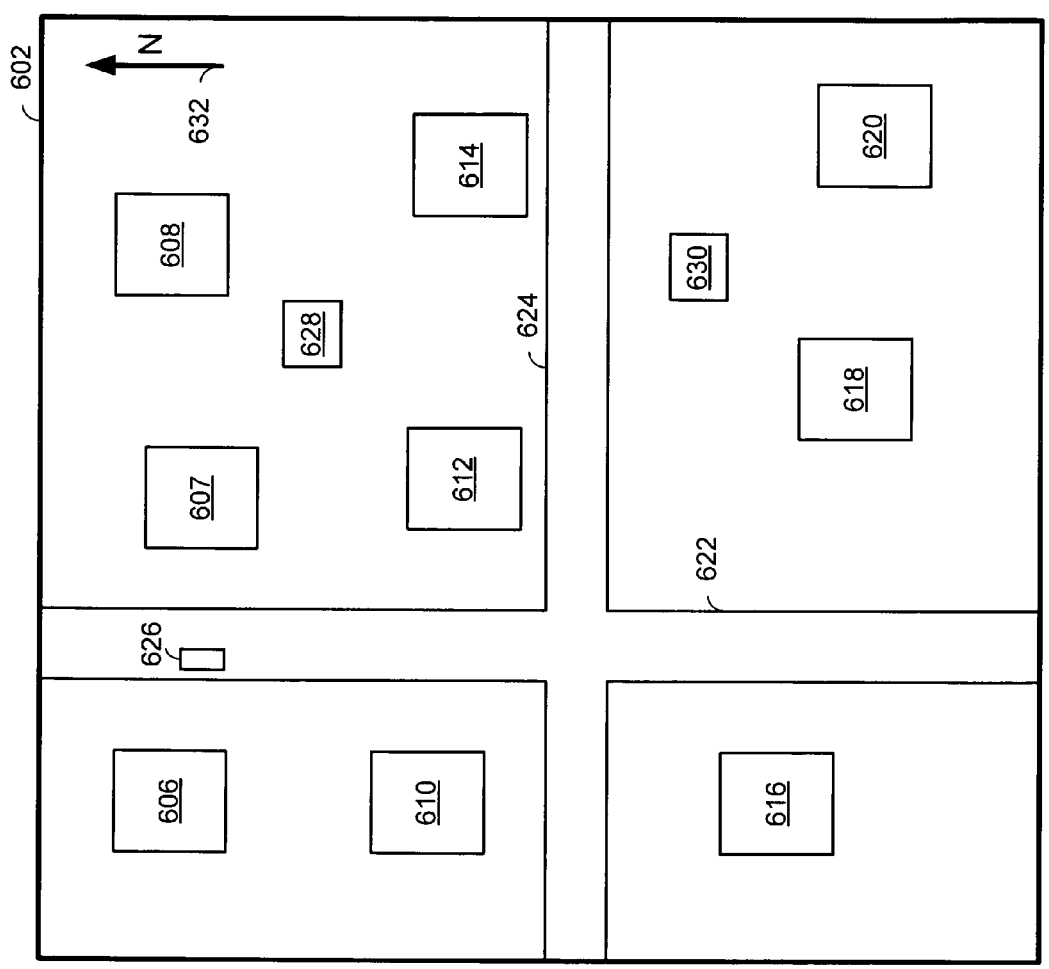
FIG. 6A is a block diagram representing a display of a wireless terminal operating according to the present invention.
Figure 6B:
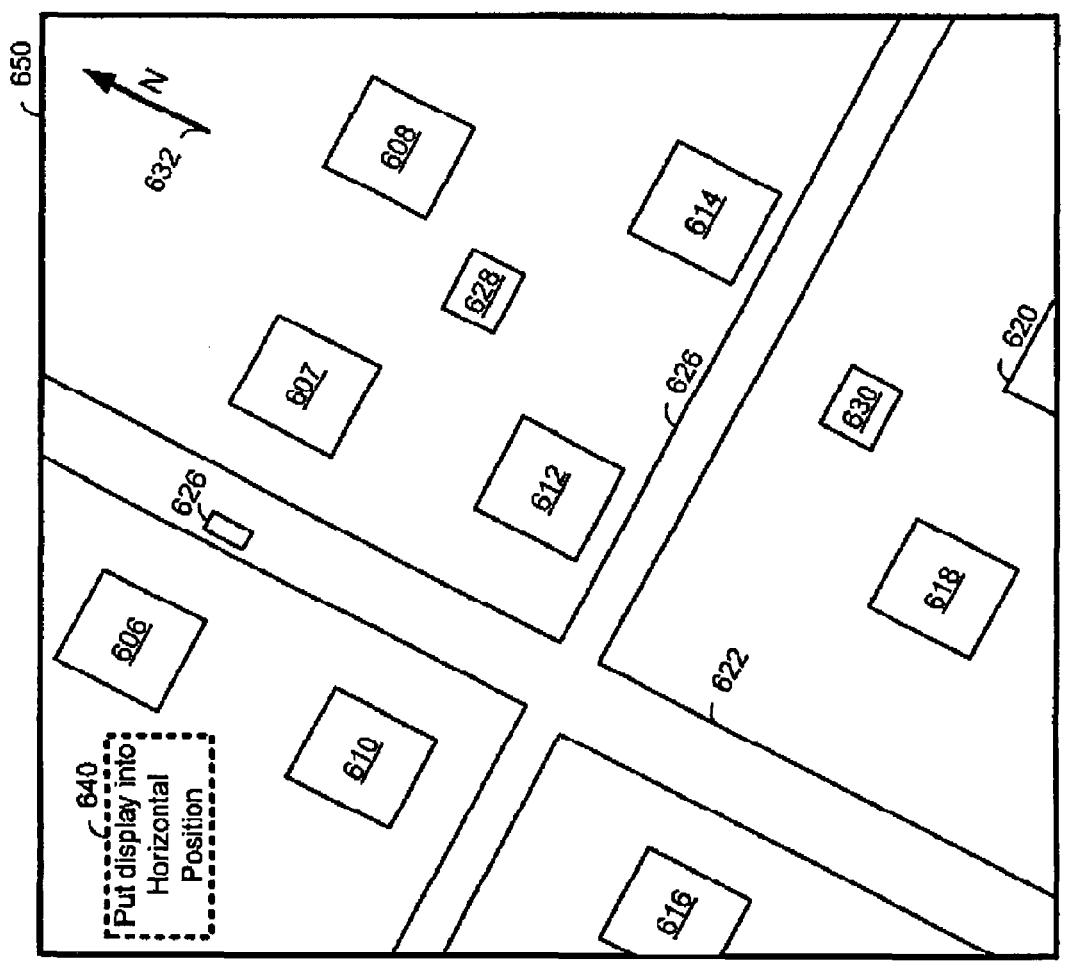
FIG. 6B is a block diagram representing a display of a wireless terminal operating according to the present invention and when in a compass mode.

FIG. 5 is a partial flow diagram illustrating "compass mode" operations according to the present invention. With compass mode operations, the seeking wireless terminal determines an orientation of the wireless terminal with respect to a reference direction (Step 502). This reference direction may be magnetic north, actual north, or another reference direction. Typically, this reference direction is determined based upon a magnetic compass, access of the GPS receiver, or by another mechanism supported by the wireless terminal. Based upon the determined orientation, the seeking wireless terminal orients the map segment on the display based upon the orientation of the seeking wireless terminal so that the map segment is displayed in a correct orientation with reference to mapped physical features (Step 504). The operation of Steps 502 and 504 may be performed concurrently with operational Step 214 of FIG. 2. FIGS. 6A and 6B illustrate further the teachings of the compass mode operations of FIG. 5.

FIG. 6A is a block diagram representing a display of a wireless terminal operating according to the present invention. As shown in FIG. 6A, the display 602 of the seeking wireless terminal has displayed there upon a map segment along with icons that represent a seeking wireless terminal 626 and sought wireless terminals 628 and 630. The display 602 is consistent with the operations of FIG. 2B. Shown in the map segment are geographic entities 606, 607, 608, 610, 612, 614, 616, 618, and 620 (referred to hereinafter as 606-620). These geographic entities 606-620 may be buildings, parks, landmarks, parking areas, or other geographic features identified within the map segment. The seeking wireless terminal may identify or provide additional information with regard to these geographic features 606-620. The actual size and shape of these geographic features 606-620 may be indicated in more detail than is shown in FIG. 6A.

The map segment shown on display 602 also shows roads 622 and 624. The seeking wireless terminal 626 is shown as an icon in the shape of an automobile because it is residing upon road 622. Track wireless terminal 628 and 630 are shown as different icons because they are not currently present on an identified roadway of the map segment. Thus, as is shown in FIG. 6A, the relative position and proximity of the sought wireless terminal 628 and 630 with respect to seeking wireless terminal 626 are clearly shown. This information may be employed by the user of seeking wireless terminal 626 to not only identify the current location of sought wireless terminals 628 and 630 but to physically meet the users of these sought wireless terminals 628 and 630 using the map segment displayed on display 602. The map segment is shown in one orientation with a reference direction 632 which in the example of FIG. 6A is the direction north.

FIG. 6B is a block diagram representing a display of a wireless terminal operating according to the present invention and when in a compass mode. As shown in FIG. 6B, the map segment on display 650 has been oriented based upon the orientation of the seeking wireless terminal with respect to a reference direction so that the geographic features 606-620 of the map segment are displayed in a correct orientation with reference to the orientation of the wireless terminal. As is shown, the north vector 632 is not oriented vertically on the display 650. Thus, as compared to the display 602 of FIG. 6A, the seeking wireless terminal resides in a different physical orientation with respect to the reference direction 632. The teachings illustrated in FIGS. 6A and 6B may be easily extended to any particular orientation of the seeking wireless terminal. Based upon the particular orientation of the wireless terminal, the reference numerals and information relating to the geographical features may be oriented in different directions for easier access by the user of the seeking wireless terminal.

Note that the operations of FIG. 6B work best when a plane of the display orients substantially in parallel to the surface of the earth. In this orientation, a reference direction of the wireless terminal, e.g., a side of the display 650, may most easily be compared to the reference direction 632. Thus, the display 602 may include a warning 640 directing the user to place the display into a horizontal position. With the display 602 in the horizontal position the geographic features 606-620 of the map segment may be most easily displayed in a correct orientation with reference to the orientation of the wireless terminal. With the display 602 not in a horizontal position, two separate operations may be employed. The relative orientation of the wireless terminal with respect to the reference direction may be best estimated and the display 602 updated based upon the best estimate. Alternately, the wireless terminal may use a last valid estimate of the relative orientation of the wireless terminal with respect to the reference direction.

Figure 7:
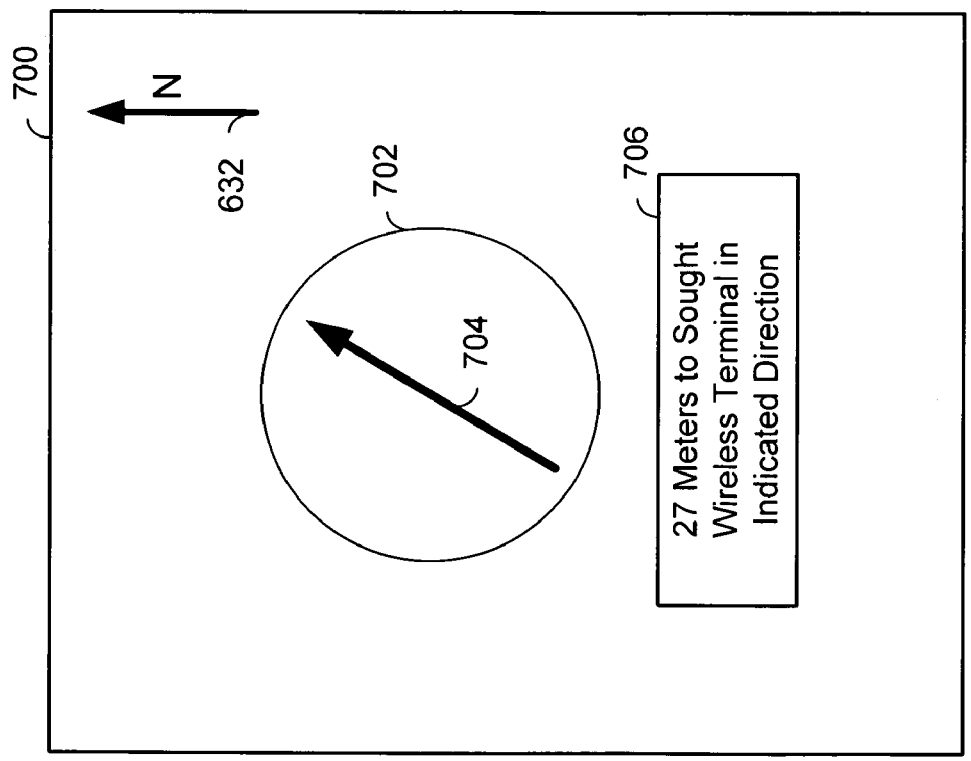
FIG. 7 is a block diagram representing a display operating according to another embodiment of the present invention.

FIG. 7 is a block diagram representing a display operating according to another embodiment of the present invention. The display 700 is consistent with the operations of FIGS. 2 and 8. The display includes an indication of the relative position of the sought wireless terminal with respect to the seeking wireless terminal. With the particular embodiment illustrated in FIG. 7, a vector 704 contained within a boundary 602 and a distance indication 706 provides the indication. A reference direction 632, e.g., North, may also be provided to the user for additional information. With this information, that is continually updated, a user of the wireless terminal may easily determine the relative position of the sought wireless terminal.

Figure 8:
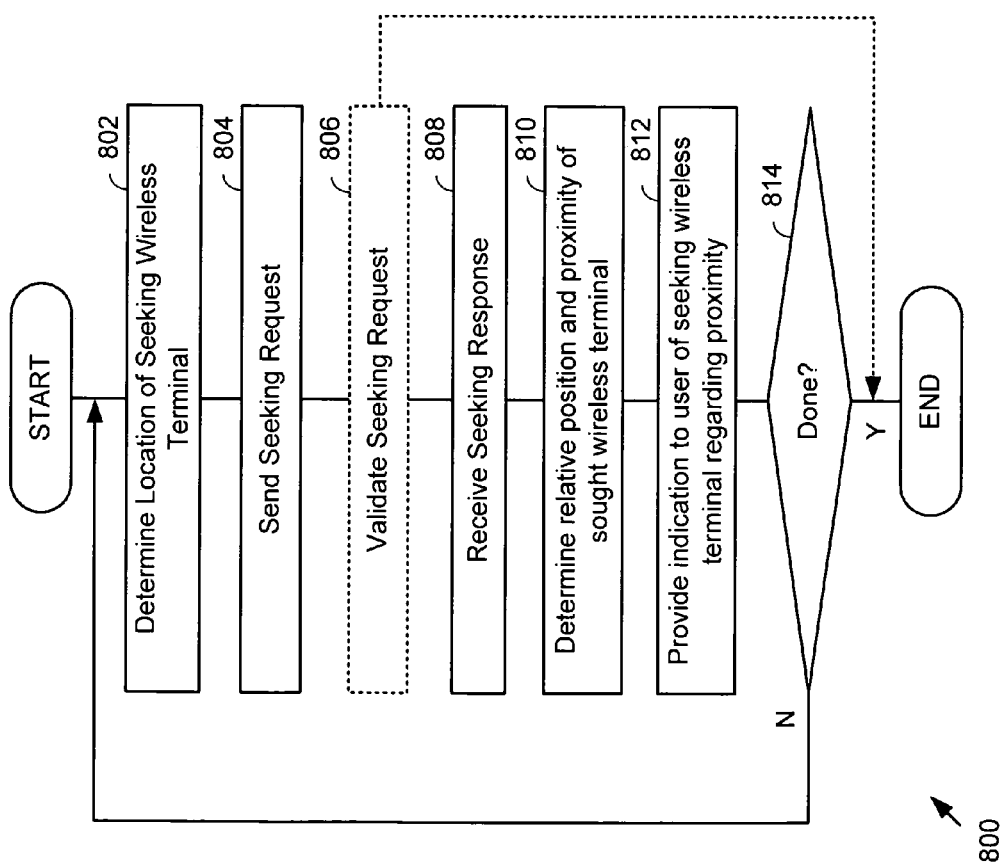
FIG. 8 is a flow diagram illustrating operation according to a second embodiment of the present invention.

FIG. 8 is a flow diagram illustrating operation according to a second embodiment of the present invention. Operation 800 according to the second embodiment commences with the seeking wireless terminal determining its location via access of the GPS receiver (Step 802). The seeking wireless terminal then sends a seeking request via supporting wireless network infrastructure (Step 804). The seeking request includes at least one interest item entered by a user of the seeking wireless terminal and the location coordinates of the seeking wireless terminal. The seeking request may then be validated at Step 806, the operations of which were described with reference to FIG. 4. When the seeking request is not valid, operation ends. When the seeking request is valid, operation proceeds with the seeking wireless terminal receiving a seeking response via the supporting wireless network infrastructure (Step 808). The seeking response includes the location coordinates of a sought wireless terminal.

The seeking wireless terminal, based upon location coordinates of the seeking wireless terminal and location coordinates of the sought wireless terminal, determines a relative position and proximity of the sought wireless terminal with respect to the seeking wireless terminal (Step 810). The seeking wireless terminal then provides an indication to the user of the seeking wireless terminal regarding the relative position of the sought wireless terminal with respect to the seeking wireless terminal (Step 812). As was previously described, the indication may include a flashing light having a flashing pattern corresponding to proximity of the sought wireless terminal with respect to the seeking wireless terminal. Alternately, the indication may be an audible alarm having an audible pattern corresponding to the proximity of the sought wireless terminal with respect to the seeking wireless terminal. Further, the indication may include a visual meter reading having an indicated magnitude corresponding to proximity of the sought wireless terminal with respect to the seeking wireless terminal. Further, the indication may be a visual vector reading having an indicated magnitude and direction corresponding to a relative position of the sought wireless terminal with respect to the seeking wireless terminal as was described with reference to FIG. 7. Then, if operation is complete (as determined at Step 814) operation ends. If operation is not complete, operation proceeds from Step 814 to Step 802.

Figure 9:
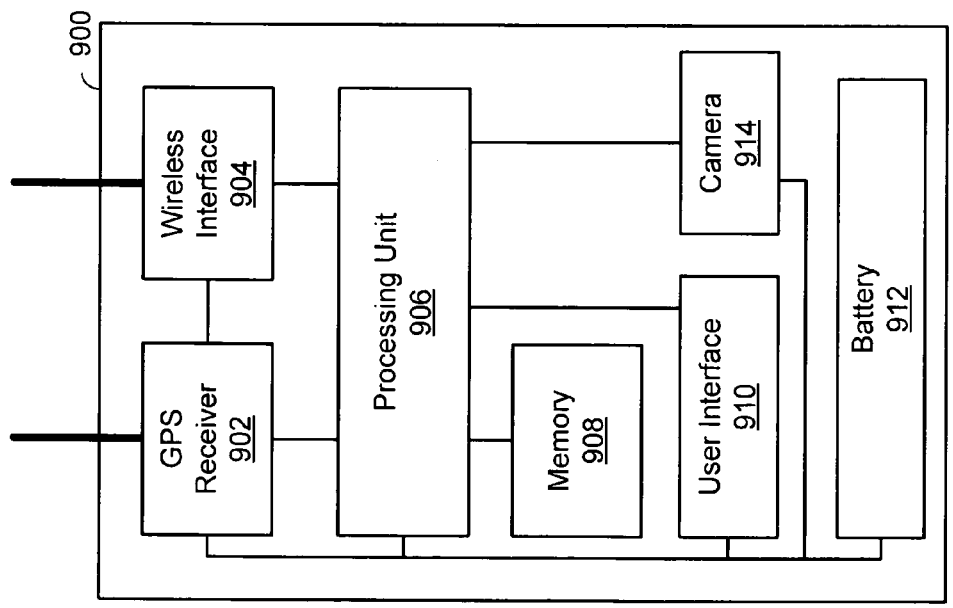
FIG. 9 is a block diagram illustrating a wireless terminal constructed according to the present invention.

FIG. 9 is a block diagram illustrating a wireless terminal constructed according to the present invention. As shown in FIG. 9, the wireless terminal 900 includes a GPS receiver 902, a wireless interface 904, a processing unit 906, memory 908, user interface 910, and a battery 912. The components of the wireless terminal 900 are typically contained within a hard case that provides protection from the elements. The wireless terminal 900 may include a camera 914. The wireless interface 904 will have particular structure and functionality based upon the type of the wireless terminal 900. For example, when the wireless terminal 900 is a cellular telephone, the wireless interface 904 will support a corresponding interface standard e.g., GSM, GPRS, EDGE, UMTS, 1xRTT, 1xEV-DO, 1xEV-DV, etc. The wireless interface 904 of the cellular telephone 904 may also/alternately support WWAN, WLAN, and/or WPAN functionality. When the wireless terminal is a WLAN terminal for example, the wireless interface 904 will support standardized communication according to the IEEE 802.11x group of standards, for example. When the wireless terminal is a WPAN device, the wireless interface 904 would support the Bluetooth interface standard or another WPAN standard such as the IEEE 802.15 standard. In any case, the wireless interface 904 may support all or a subset of cellular telephone, WLAN, WWAN, and WPAN operations.

The processing unit 906 may include any type of processor such as a microprocessor, a digital signal processor, an Application Specific Integrated Circuit (ASIC), or a combination of processing type devices. The processing unit 906 is operable to execute a plurality of software instructions that are stored in memory 908 and downloaded for execution. The processing unit 906 may also include specialized hardware required to implement particular aspects of the present invention. Memory 908 may include SRAM, DRAM, PROM, flash RAM, a hard disk drive, an optical media drive, or any other type of memory capable of storing data and instructions.

A user interface 910 may include a microphone, a speaker, a keypad, a screen, a touch screen, a cursor control device, a light, a voice recognition system, an optical recognition system that would authenticate a user's iris, for example, and/or any other type of interface that may be employed in the wireless terminal. In some embodiments, the user interface 910 may include therewith ability to service a headset including a microphone and an earpiece for the user. Battery 912 powers the components of the wireless terminal 900.

Figure 10:
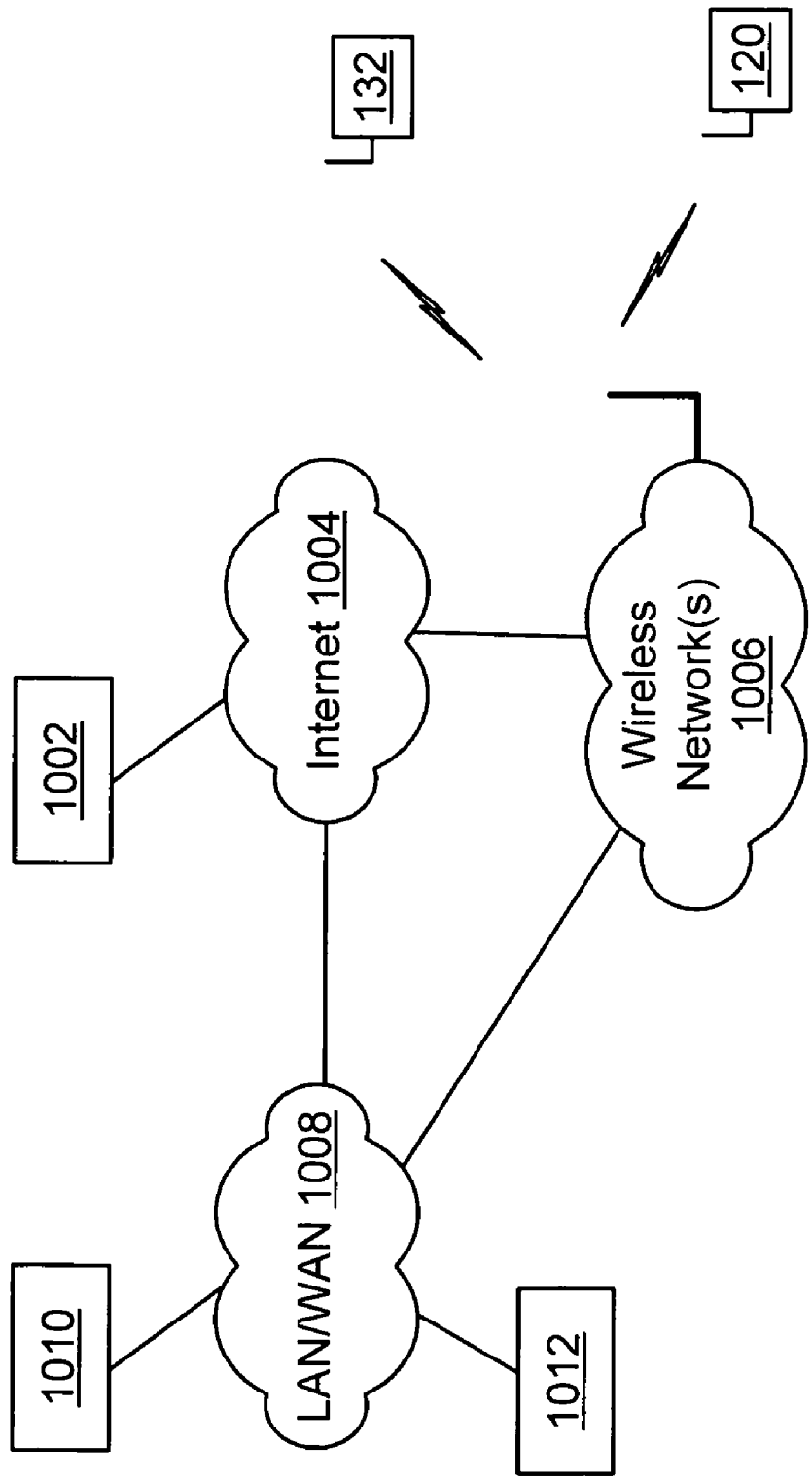
FIG. 10 is a system diagram illustrating a system that may be used according to the present invention.

FIG. 10 is a system diagram illustrating a system that may be used according to the present invention. The system includes a wireless network 1006 that supports wireless communications with the wireless terminal 120, the Internet 1002, and a LAN/WAN 1008 that intercouples with the Internet 1004 and the wireless network 1006. The system of FIG. 10 also includes server computers 1002, 1010, and 1012 that may service the operations of the present invention for wireless terminals 120 and 132. Thus, wireless terminal 120 may be a seeking wireless terminal while wireless terminal 132 may be a sought wireless terminal. The supporting wireless network infrastructure 1006 supports the messages between the seeking wireless terminal 120 and the sought wireless terminal 132. The one or more of the server computers 1002, 1010, and 1012 may identify the sought wireless terminal 132 to the seeking wireless terminal 120, service the permission operations, and/or serve as a map server. In identifying the sought wireless terminal 132 to the seeking wireless terminal 120, the server computers 1002, 1010, and 1012 may reconcile the interest items transmitted in the seeking request from the seeking wireless terminal 120 with information items corresponding to the sought wireless terminal 132. Based upon this reconciliation, the server computer 1002, 1010, or 1012 would identify the sought wireless terminal 132 in the seeking response. Thus, in such case, the server computer 1002, 1010, or 1012 would provide a matchmaking service for the wireless terminals 120 and 122.

As one of average skill in the art will appreciate, the term "substantially" or "approximately," as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the terms "communicatively coupled" or "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled." As one of average skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents, and alternatives falling within the spirit and scope of the present invention as defined by the claims.

The invention claimed is:

1. A method for operating a seeking wireless terminal to display information regarding a proximately located sought wireless terminal, the method comprising:
   determining location coordinates of the seeking wireless terminal via access of a Global Positioning System (GPS) receiver of the seeking wireless terminal;
   sending a seeking request via a supporting wireless network infrastructure, the seeking request including at least one interest item entered by a user of the seeking wireless terminal and the location coordinates of the seeking wireless terminal;
   receiving a seeking response via the supporting wireless network infrastructure, the seeking response including location coordinates of a sought wireless terminal;
   determining a relative position of the location coordinates of the sought wireless terminal with respect to the location coordinates of the seeking wireless terminal; and
   displaying an indication on the display to indicate the relative position of the sought wireless terminal with respect to the seeking wireless terminal, including:
      a vector indicating a relative direction to the sought wireless terminal from the seeking wireless terminal; and
      an indication of a distance to the sought wireless terminal from the seeking wireless terminal.

2. The method of claim 1, further comprising:
   accessing a map segment corresponding to the location coordinates of the seeking wireless terminal and to the location coordinates of the sought wireless terminal; and
   displaying the map segment, an icon that represents the seeking wireless terminal at a relative position of the location coordinates of the seeking wireless terminal on the map segment, and an icon that represents the sought wireless terminal at a relative position of the location coordinates of the sought wireless terminal on the map segment on a display of the seeking wireless terminal.

3. The method of claim 2, further comprising:
   determining an orientation of the seeking wireless terminal with respect to a reference direction; and
   orienting the map segment on the display based upon the orientation of the seeking wireless terminal so that the map segment is displayed in a correct orientation with reference to mapped physical features.

4. The method of claim 1, wherein the seeking request includes information selected from the group consisting of at least:
   an identity of a user of the seeking wireless terminal;
   information regarding a physical appearance of the user of the seeking wireless terminal;
   a picture of the user of the seeking wireless terminal;
   personal information regarding the user of the seeking wireless terminal;
   a user statement intended for a user of the sought wireless terminal;
   a user query intended for a user of the sought wireless terminal;
   information regarding an age of the user of the seeking wireless terminal;
   information regarding societal demographics of the user of the seeking wireless terminal; and
   information regarding an available meeting time of the user of the seeking wireless terminal.

5. The method of claim 1, wherein the seeking response includes information selected from the group consisting of at least:
   an identity of a user of the sought wireless terminal;
   information regarding a physical appearance of a user of the sought wireless terminal;
   a picture of a user of the sought wireless terminal;
   personal information regarding the user of the sought wireless terminal;
   a user statement intended for to user of the socking wireless terminal;
   a user query intended for the user of the seeking wireless terminal;
   information regarding an age of the user of the seeking wireless terminal;
   information regarding societal demographics of the user of the seeking wireless terminal; and
   information regarding an available meeting time of the user of the seeking wireless terminal.

6. The method of claim 1, wherein the at least one interest item is selected from the group consisting of:
   information regarding companionship goals of a user of the seeking wireless terminal;
   information regarding team building goals of the user of the seeking wireless terminal; and
   information regarding business transaction goals of the user of the seeking wireless terminal.

7. The method of claim 1, further comprising:
receiving a communication request from a user of the seeking wireless terminal; and
servicing the communication request by transmitting a communication to the sought wireless terminal via the supporting wireless network infrastructure.

8. The method of claim 1, further comprising:
determining a proximity of the sought wireless terminal to the seeking wireless terminal; and
based upon the proximity, providing a proximity alert to the user of the seeking wireless terminal.

9. The method of claim 8, wherein the proximity alert is selected from the group consisting of at least:
a flashing light having a flashing pattern corresponding to the proximity;
an audible alarm having an audible pattern corresponding to the proximity;
a visual meter reading having an indicated magnitude corresponding to the proximity; and
a visual vector reading having an indicated magnitude and direction corresponding to the proximity.

10. The method of claim 1, further comprising:
receiving a seeking permission query from a requesting device via the supporting wireless network infrastructure;
presenting a user input request in response to the seeking permission query via a user interface of the seeking wireless terminal;
receiving a user input response via the user interface of the seeking wireless terminal;
creating a seeking permission response based upon the user input response; and
transmitting the seeking permission response via the supporting wireless network infrastructure to the requesting device.

11. The method of claim 10, wherein the requesting device is selected from the group consisting of at least the sought wireless terminal and a server computer.

12. A wireless terminal comprising:
a wireless interface;
a user interface including a display;
a Global Positioning System (GPS) receiver; and
a processing unit communicatively coupled to the wireless interface, the user interface, and the GPS receiver and operable to:
determine location coordinates of the wireless terminal via access of the GPS receiver;
send a seeking request via the wireless interface and a supporting wireless network infrastructure, the seeking request including at least one interest item entered by a user of the wireless terminal and the location coordinates of the wireless terminal;
receive a seeking response via the supporting wireless network infrastructure and the wireless interface, the seeking response including location coordinates of a sought wireless terminal;
determine a relative position of the location coordinates of the sought wireless terminal with respect to the location coordinates of the wireless terminal; and
displaying an indication on the display to indicate the relative position of the sought wireless terminal with respect to the wireless terminal, the indication including:
a vector indicating a relative direction to the sought wireless terminal from the seeking wireless terminal; and
an indication of a distance to the sought wireless terminal from the seeking wireless terminal.

13. The wireless terminal of claim 12, wherein the processing unit is further operable to:
access a map segment corresponding to the location coordinates of the wireless terminal and to the location coordinates of the sought wireless terminal; and
display the map segment, an icon that represents the wireless terminal at a relative position of the location coordinates of the wireless terminal on the map segment, and an icon that represents the sought wireless terminal at a relative position of the location coordinates of the sought wireless terminal on the map segment on the display.

14. The wireless terminal of claim 13, further comprising:
determining an orientation of the wireless terminal with respect to a reference direction; and
orienting the map segment on the display based upon the orientation of the wireless terminal so that the map segment is displayed in a correct orientation with reference to mapped physical features.

15. The wireless terminal of claim 12, wherein the seeking request includes information selected from the group consisting of at least:
an identity of a user of the wireless terminal;
information regarding a physical appearance of the user of the wireless terminal;
a picture of the user of the wireless terminal;
personal information regarding the user of the wireless terminal;
a user statement intended for a user of the sought wireless terminal;
a user query intended for a user of the sought wireless terminal;
information regarding an age of the user of the wireless terminal;
information regarding societal demographics of the user of the wireless terminal; and
information regarding an available meeting time of the user of the wireless terminal.

16. The wireless terminal of claim 12, wherein the seeking response includes information selected from the group consisting of at least:
an identity of a user of the sought wireless terminal;
information regarding a physical appearance of a user of the sought wireless terminal;
a picture of a user of the sought wireless terminal;
personal information regarding the user of the sought wireless terminal;
a user statement intended for the user of the wireless terminal;
a user query intended for the user of the wireless terminal;
information regarding an age of the user sought wireless terminal;
information regarding societal demographics of the user of the wireless terminal; and
information regarding an available meeting time of the user of the wireless terminal.

17. The wireless terminal of claim 12, wherein the at least one interest item is selected from the group consisting of:
information regarding companionship goals of a user of the wireless terminal;
information regarding team building goals of the user of the wireless terminal; and
information regarding business transaction goals of the user of the wireless terminal.

18. The wireless terminal of claim 12, wherein the processing unit is further operable to:
  receive a communication request from a user of the wireless terminal; and
  service the communication request by transmitting a communication to the sought wireless terminal via the wireless interface and the supporting wireless network infrastructure.

19. The wireless terminal of claim 12, further comprising:
  determining a proximity of the sought wireless terminal to the wireless terminal; and
  based upon the proximity, providing a proximity alert to the user of the wireless terminal.

20. The wireless terminal of claim 19, wherein the proximity alert is selected from the group consisting of at least:
  a flashing light having a flashing pattern corresponding to the proximity;
  an audible alarm having an audible pattern corresponding to the proximity;
  a visual meter reading having an indicated magnitude corresponding to the proximity; and
  a visual vector reading having an indicated magnitude and direction corresponding to the proximity.

* * * * *

UNITED STATES PATENT AND TRADEMARK OFFICE
CERTIFICATE OF CORRECTION

PATENT NO. : 7,312,700 B2  
APPLICATION NO. : 11/069536  
DATED : December 25, 2007  
INVENTOR(S) : Jeyhan Karaoguz and James D. Bennett It is certified that error appears in the above-identified patent and that said Letters Patent is hereby corrected as shown below:

Col. 10, line 41 Claim 5 should read:

5. The method of claim 1, wherein the seeking response includes information selected from the group consisting of at least: an identity of a user of the sought wireless terminal; information regarding a physical appearance of a user of the sought wireless terminal; a picture of a user of the sought wireless terminal; personal information regarding the user of the sought wireless terminal; a user statement intended for to user of the seeking wireless terminal; a user query intended for the user of the seeking wireless terminal; information regarding an age of the user of the seeking wireless terminal; information regarding societal demographics of the user of the seeking wireless terminal; and information regarding an available meeting time of the user of the seeking wireless terminal.

Col. 10, line 60 Claim 16 should read:

16. The wireless terminal of claim 12, wherein the seeking response includes information selected from the group consisting of at least: an identity of a user of the sought wireless terminal; information regarding a physical appearance of a user of the sought wireless terminal; a picture of a user of the sought wireless terminal; personal information regarding the user of the sought wireless terminal; a user statement intended for the user of the wireless terminal; a user query intended for the user of the wireless terminal; information regarding an age of the user of the wireless terminal; information regarding societal demographics of the user of the wireless terminal; and information regarding an available meeting time of the user of the wireless terminal.

Signed and Sealed this

Sixth Day of May, 2008

JON W. DUDAS  
*Director of the United States Patent and Trademark Office*